(12) United States Patent
Kennedy (10) Patent No.: US 10,320,502 B2
(45) Date of Patent: Jun. 11, 2019

(54) AUDIO CAPTURE

(71) Applicant: Comcast Cable Communications, LLC, Philadelphia, PA (US)

(72) Inventor: Chris Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 332 days.

(21) Appl. No.: 13/740,887

(22) Filed: Jan. 14, 2013

(65) Prior Publication Data

US 2014/0200694 A1 Jul. 17, 2014

(51) Int. Cl.
*H04H 60/27* (2008.01)
*G06F 16/68* (2019.01)
(Continued)

(52) U.S. Cl.
CPC .............. *H04H 60/27* (2013.01); *G06F 16/68* (2019.01); *G06F 16/683* (2019.01); *G06F 17/30743* (2013.01); *G06F 17/30749* (2013.01); *H04H 60/372* (2013.01); *H04H 60/44* (2013.01); *H04H 60/65* (2013.01); *H04H 60/58* (2013.01)

(58) Field of Classification Search
CPC ......... G06F 17/30026; G06F 17/30041; G06F 17/30044; H04H 20/14; H04H 60/27; H04H 60/37; H04H 60/39; H04H 60/40; H04H 60/42; H04H 60/44; H04H 60/58; H04H 60/80; H04H 2201/30; H04N 5/76; H04N 21/4334; H04N 21/4622; H04W 4/02
USPC ...... 348/E7.071; 455/3.02, 3.06, 414.2, 418, 455/420; 700/94; 706/48; 707/769, 913, 707/999.003, 999.107, E17.009, E17.014, 707/E17.044, E17.101; 709/205, 217; 725/9, 35, 61, 115
See application file for complete search history.

(56) References Cited

U.S. PATENT DOCUMENTS 7,058,376 B2   6/2006 Logan et al.
7,343,141 B2 * 3/2008 Ellis .................. H04B 1/20
                                                    348/553

(Continued)

OTHER PUBLICATIONS iTunes Preview "TuneIn Radio Pro", dated Oct. 29, 2012, retrieved on Aug. 1, 2013 from http://web.archive.org/web/20121103161831/http://itunes.apple.com.

(Continued)

*Primary Examiner* — Duc Nguyen
*Assistant Examiner* — Alexander L Eljaiek
(74) *Attorney, Agent, or Firm* — Banner & Witcoff, Ltd.

(57) ABSTRACT

A system may allow users to automatically record radio programs for later consumption. When a user is listening to a radio program in the car, and arrives at the destination, the user's mobile device may capture an audio sample of the radio station, along with a GPS location of the user, and may transmit this information to a radio station application server. The server may use the location to identify a list of candidate radio stations, and may compare the audio sample with reference recordings of the candidate radio stations, to identify the radio station and program. The program may then be recorded for the user and subsequently played back at the user's convenience and on a device selected by the user, such as a mobile device, television, computer, DVR, or the like.

20 Claims, 7 Drawing Sheets

(51) Int. Cl.
*G06F 16/683* (2019.01)
*G06F 17/30* (2006.01)
*H04H 60/37* (2008.01)
*H04H 60/44* (2008.01)
*H04H 60/65* (2008.01)
*H04H 60/58* (2008.01)

(56) References Cited

U.S. PATENT DOCUMENTS

| | | | |
|---|---|---|---|
| 2003/0163823 A1* | 8/2003 | Logan et al. | 725/89 |
| 2004/0143349 A1* | 7/2004 | Roberts et al. | 700/94 |
| 2004/0209592 A1* | 10/2004 | Kirkeby | H04H 60/27 |
| | | | 455/344 |
| 2008/0082510 A1* | 4/2008 | Wang | H04H 60/37 |
| 2008/0108301 A1* | 5/2008 | Dorenbosch | H04L 12/66 |
| | | | 455/3.06 |
| 2009/0023406 A1* | 1/2009 | Ellis et al. | 455/140 |
| 2009/0144237 A1* | 6/2009 | Branam | G06F 21/31 |
| 2011/0087490 A1* | 4/2011 | Olson | G10L 25/48 |
| | | | 704/231 |
| 2013/0052939 A1* | 2/2013 | Anniballi | H04H 60/44 |
| | | | 455/3.01 |
| 2013/0091239 A1* | 4/2013 | Hao | H04L 29/06326 |
| | | | 709/217 |

OTHER PUBLICATIONS

PCMag "TuneIn Radio Pro (for iPad) Review & Rating", dated Nov. 30, 2012, retrieved from http://www.pcmag.com/article2/0,2817,2383584,00.asp.

* cited by examiner

AUDIO CAPTURE

BACKGROUND

Travelers such as drivers who listen to radio programs often face a conundrum when they have arrived at their destination before the radio program has ended. They have a choice of staying in the car or other location to listen to the remainder of the radio program, or they can leave and miss the remainder of the radio program. There is a need to assist users in this situation.

SUMMARY

The following summary is for illustrative purposes only, and is not intended to limit or constrain the detailed description.

In some embodiments, a computing device may assist users in resuming listening to their radio programs. The computing device may obtain an audio sample of the radio station while the user is listening, and also obtain location information, and send a record request containing both the audio sample and the location information. The request may be sent to a remote server. In some embodiments, the request may be accompanied by a textual note entered by the user to assist in remembering why he/she wanted to record the program.

In some embodiments, the record request may be automatically generated in response to the user arriving at their destination, leaving a location, such as a vehicle, or in response to the user shutting off an automobile engine.

In some embodiments, the user may be asked to assist in determining the radio station that should be recorded. For example, the device may communicate with the user's automobile and obtain a listing of the user's radio presets, and display a listing from which the user may select. Alternatively, the listing of candidates may be made based on the geographic location of the user, based on information identifying regional coverage areas of various radio stations.

The user may resume listening using the computing device, and the playback may begin, manually or automatically, at a point in time corresponding to when the recording request was made. The playback may begin at an offset time from the request, such as a few minutes before.

The user may have a variety of delivery options for listening to the recording. The user may use the same computing device to initiate a data stream, or the recording (or a link thereto) may be delivered by email to the user's account, or the recording may be delivered to another device of the user. In some embodiments, the user may have the radio station recordings listed along with video program listings in a digital video recorder (DVR) listing.

A radio station application server may deduce the radio station of the user by comparing an audio sample of the program with recorded audio from various radio stations. The server may first narrow the list of candidate stations by obtaining the location information of the user, and consulting a listing of known radio stations and their regions of coverage.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
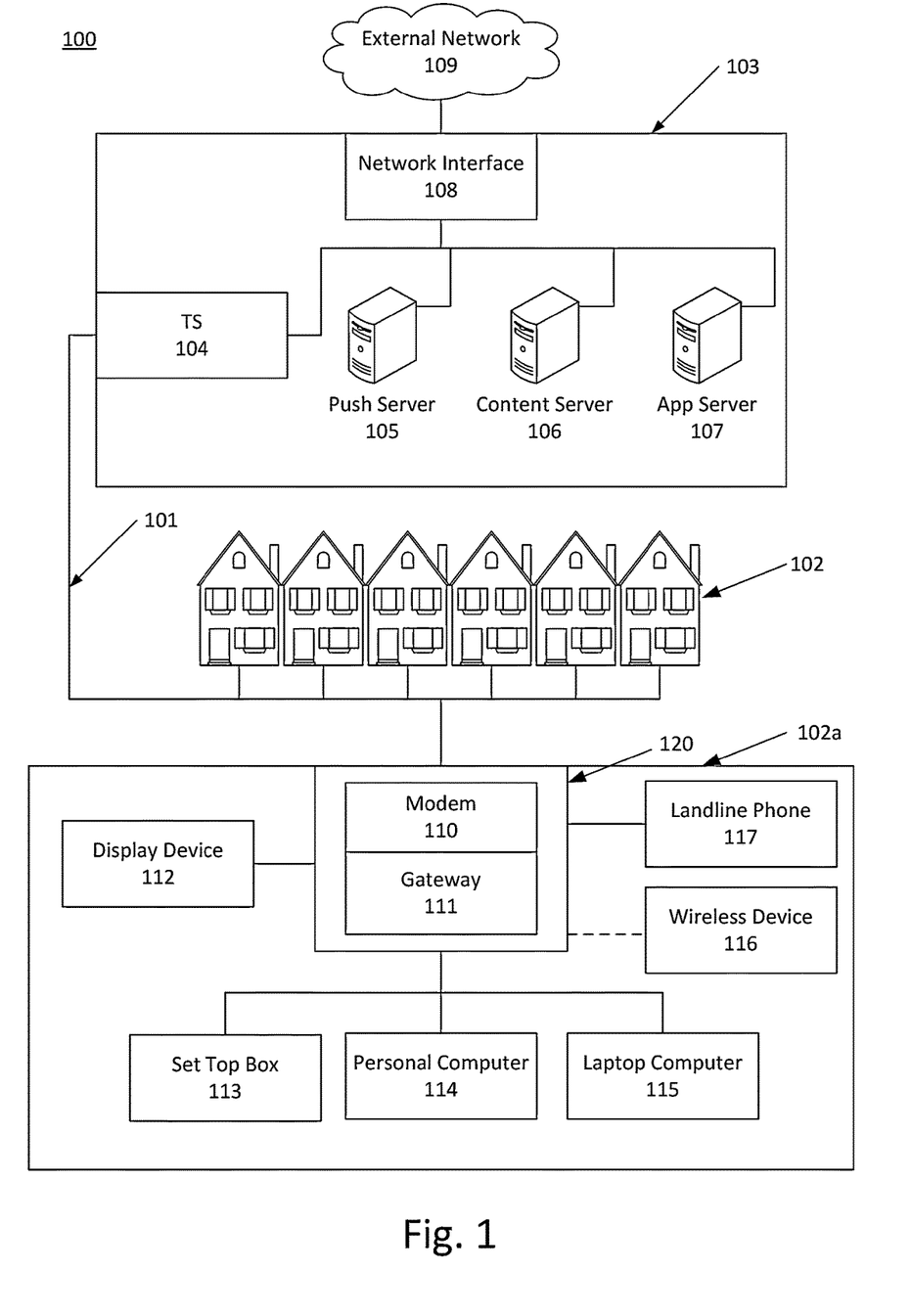
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
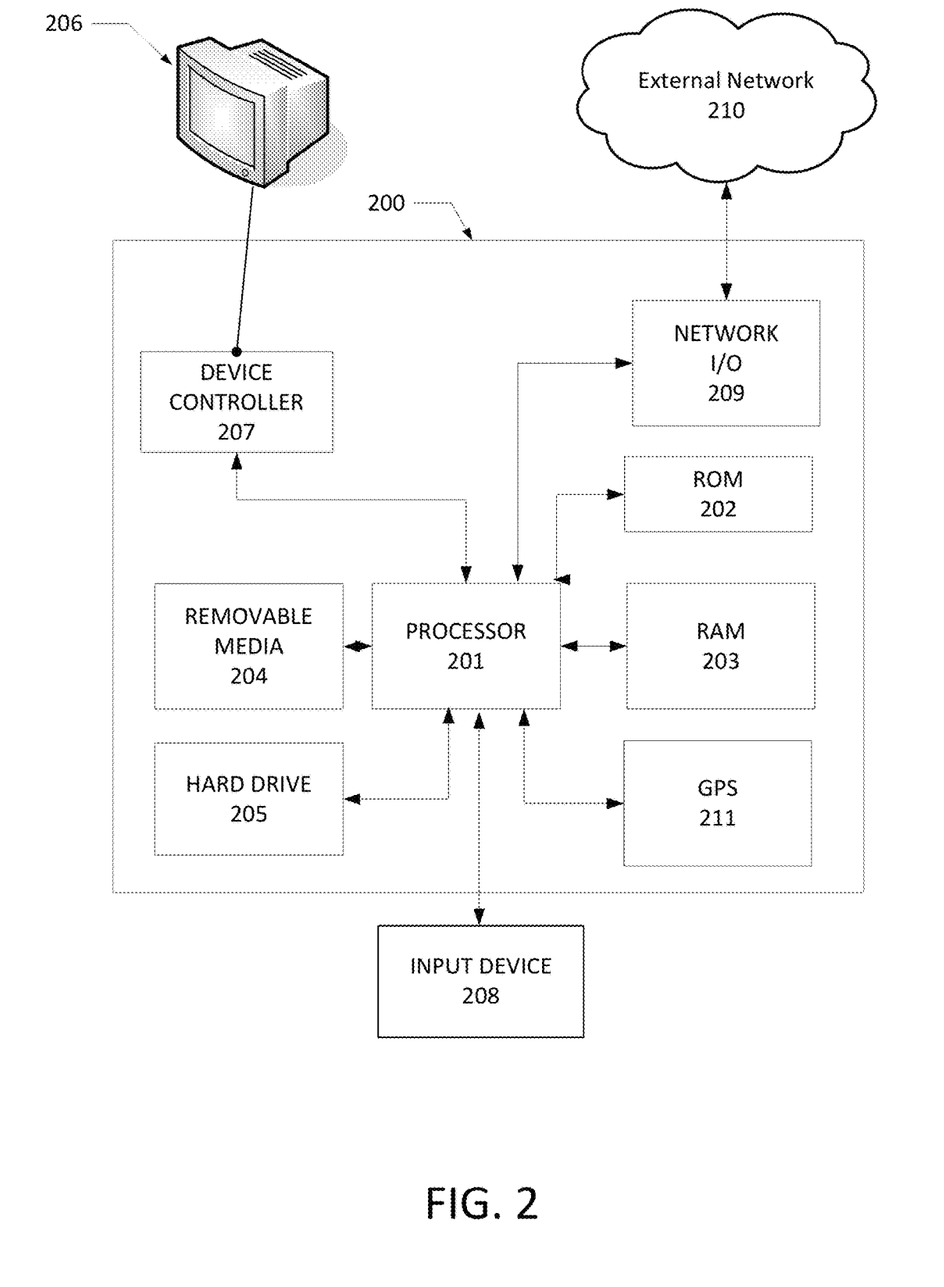
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc.

components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
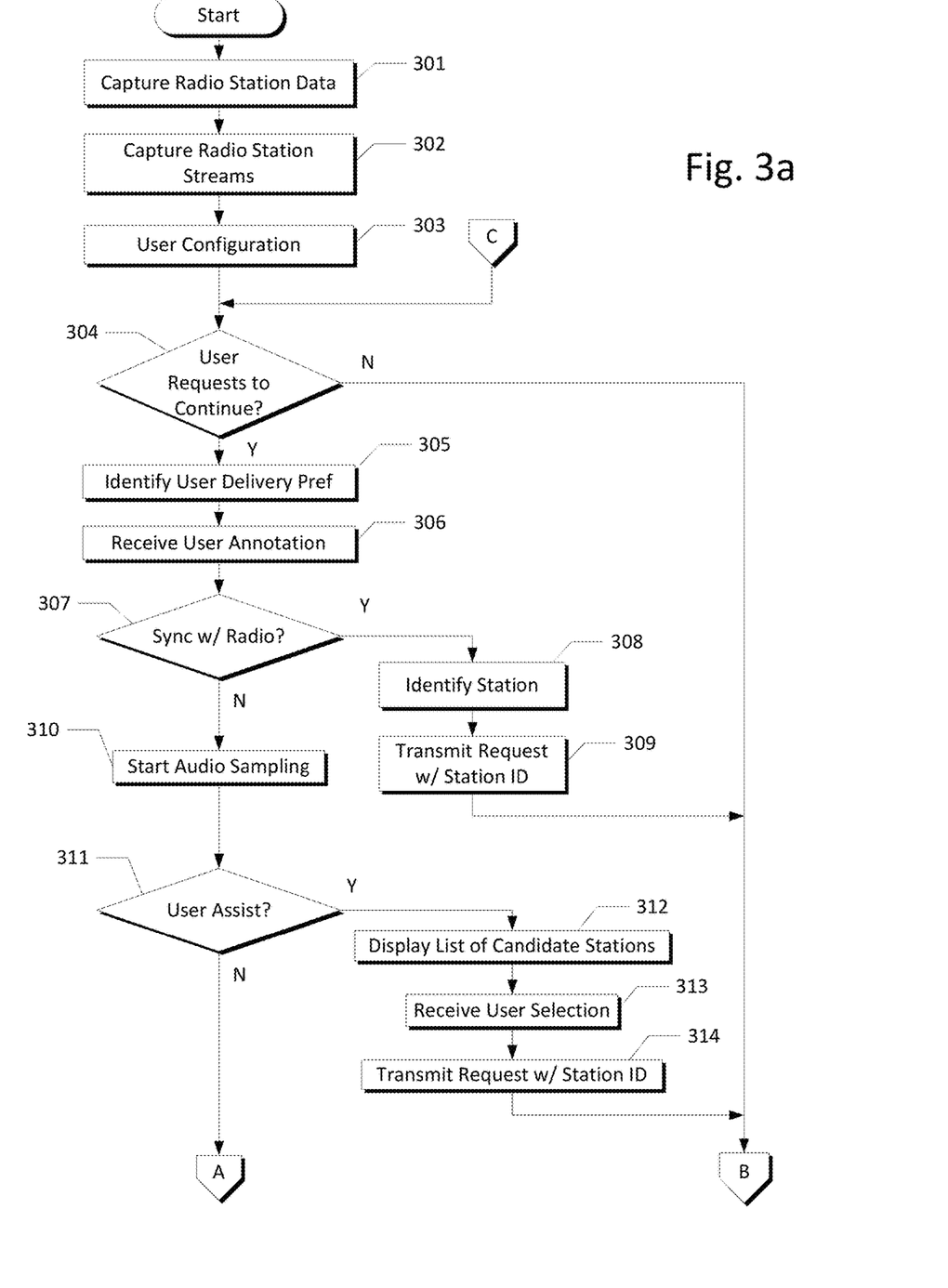
FIGS. 3a-b illustrate an example process flow for implementing various features described herein.
Figure 4:
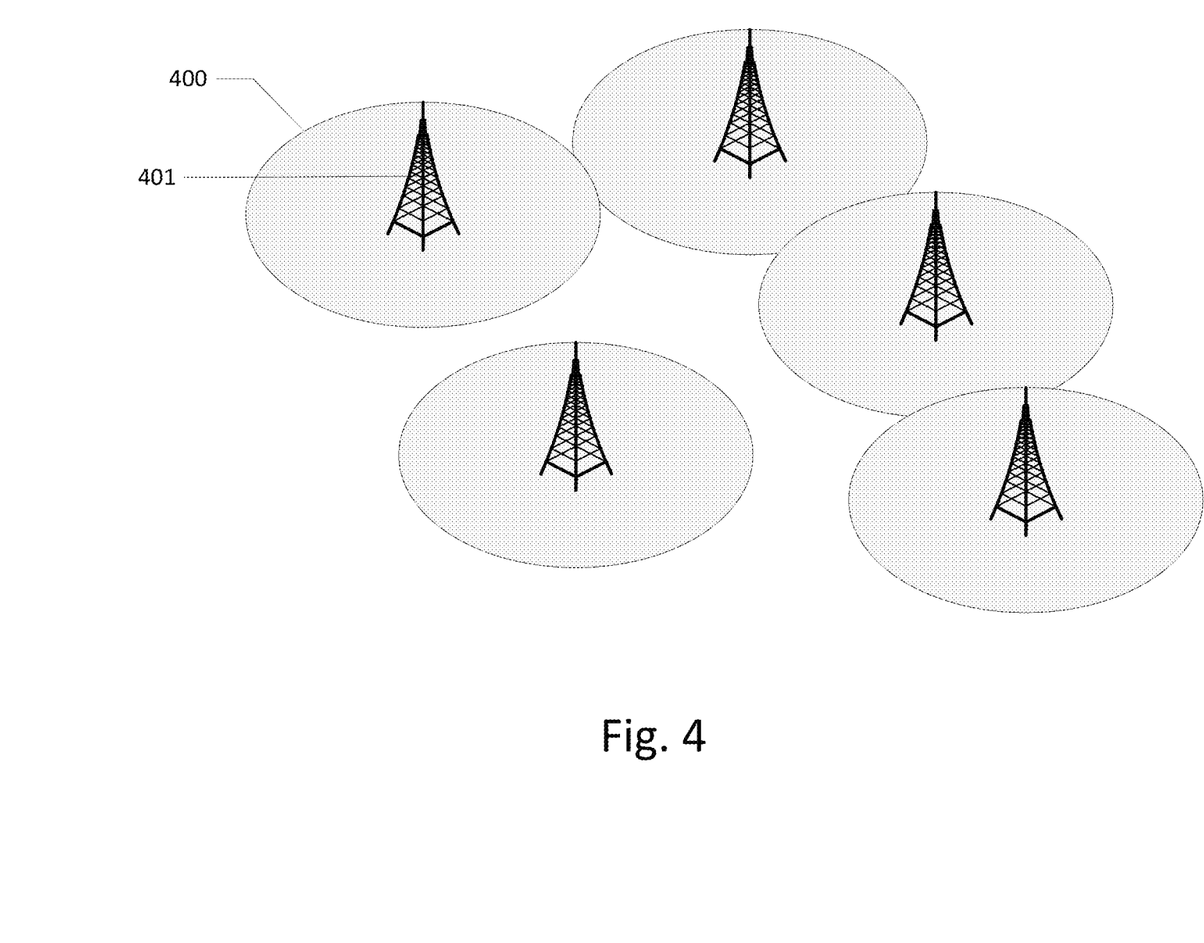
FIG. 4 illustrates an example radio topology and coverage.

FIG. 3 illustrates an example method employing features described herein. The method steps may be performed by a computing device, such as an application server 107, device 200, or user's smartphone 116, or by any desired combination of these devices. In step 301, a radio station application server 107 may capture (e.g., store) radio station data. The radio station data may identify the various radio stations that are supported by the system described herein, which the system will make available to users. The radio station data may identify the radio station by a call sign (e.g., WKRP), name (e.g., "Easy 107.1"), numeric code, frequency, Internet stream identifier, or any other desired identifier. The radio station data may also include location information, identifying an area of coverage for the station. This location information may, for example, include information identifying GPS coordinates of the various transmitters used by the radio station, as well as the power of the transmitters. Average propagation distances may be determined using this information, such as by determining a typical distance from the transmitter at which a radio receiver may still receive the radio station signal. The distance may form a radius of a coverage area 400 for the station's transmitter 401, as illustrated in FIG. 4. FIG. 4 illustrates a plurality of transmitters with a plurality of corresponding coverage areas, and those transmitters may be used for the same radio station, or for different radio stations.

Alternatively, the location information may identify a radio station's coverage area by identifying the coordinates of the geographic contours of the radio station's coverage area. As another alternative, the location information may identify the coverage area by listing mailing zone ZIP codes, or township and city names.

The radio station information may also identify program schedules for the radio station, such as program names, corresponding times, personalities and subject matter descriptions. Other information may be stored as well.

Although the radio stations are illustrated with terrestrial transmitters, the radio stations need not be terrestrial. For example, the radio stations may be transmitted from extraterrestrial orbiting satellites, or any other desired wireless audio network.

In step 302, the various audio content from the listed radio stations may be captured by the radio application server 107. This capturing may be accomplished by a plurality of servers, each configured to receive one or more of the radio stations, and to record its contents in a memory. The reception of the radio station may be done using radio antennas, tuning to the radio station frequency. Alternatively, the radio station may supply a digital stream of its broadcast to the radio application server. Recording a radio station's broadcast feed may include storing additional data, such as information identifying the program speakers, personalities and content, similar to the radio station data above, but updated to reflect any deviations from the scheduled programs (e.g., if one segment runs long, or if a program skips a scheduled appearance of a guest, or if an unexpected guest or event occurs, etc.). The recording of the broadcast feed may also include processing the data to identify audio characteristics, such as tone patterns and timing data, which may be used in future comparisons with audio snippets captured by user devices (described further below).

Figure 5A:
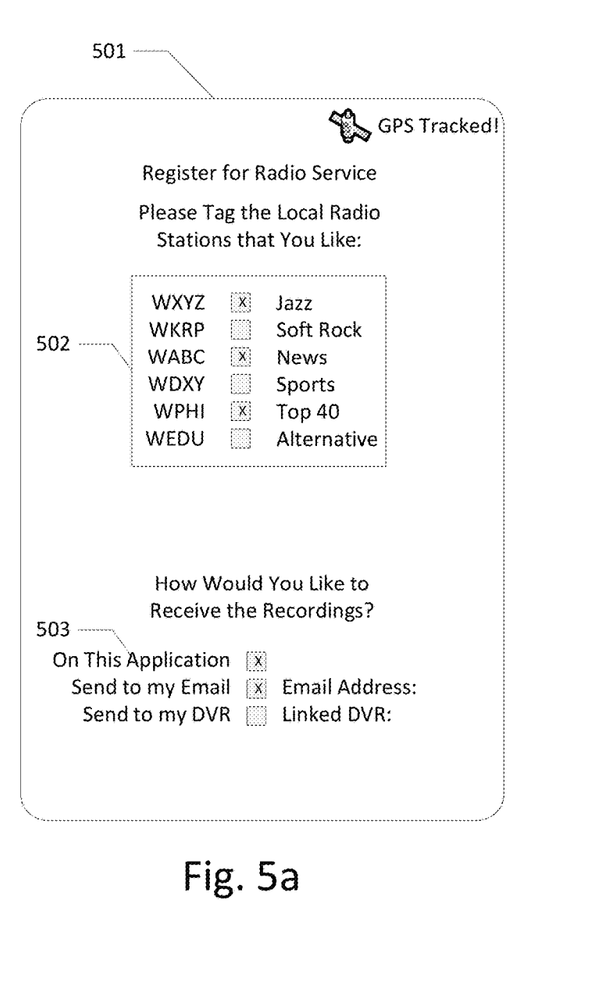
FIGS. 5a-d illustrate various example user interface screens that may be presented to the user in aspects described herein.

In step 303, the user may configure an account with the radio application server 107, to register the user for the service provided by the radio application server 107. This configuration may involve the user providing a variety of data, such as user identification, identification of one or more devices that the user uses to receive radio content (e.g., identifying devices by Media Access Control address, network address, radio make and/or model, etc.), and user preferences, which the server 107 may store in memory. The user preferences may include, for example, identification of the user's favorite radio stations and/or radio programs, the user's geographic home location, taste preferences regarding audio (e.g., volume level, equalizer settings, etc.). FIG. 5a illustrates an example user interface 501 that may be presented to the user on a device, such as the user's smartphone or computer, to identify favorite stations 502.

The user configuration may also include identification of ways 503 in which the user wishes to receive radio content recorded by the radio server 107. For example, the user may indicate that he/she wishes to receive radio content as a digital stream using the same application that presents the interface 501. The user may wish to receive an audio file, or a network link to an audio file, containing the recording. The user may also request to have the recorded content automatically delivered to another device of the user, such as the user's home Digital Video Recorder (DVR), personal computer, set-top box, etc.

The user configuration may also include loading of an application on a mobile device of the user, such as a GPS-enabled smartphone. The application loaded on the mobile device may include software instructions to provide the interface 501, as well as to perform the various steps described further below with respect to the mobile device, and may include GPS functionality, recording functionality, presentation of user interfaces, and communication of data.

The user configuration may also include establishing communications between the mobile device and the user's car radio. For example, if the radio and mobile device are both BLUETOOTH-equipped, then the configuration may include establishing a BLUETOOTH connection between the mobile device and the radio, allowing the two to exchange data as needed.

In step 304, the user's mobile device may determine whether the user has entered a request to continue listening to a radio station. The user may enter this request, for example, by simply pressing a button 504 on a mobile device radio application interface 501 when the user decides that he/she is nearing a destination, or when the user discovers that he/she is losing reception of the radio station, and that he/she would like to hear the rest of the current program. The request may be entered in other ways. For example, the user may set preferences to indicate that certain programs should always be recorded. The user can set a preference to indicate that the programs should always be recorded if the user is listening to the program when the user arrives at a destination (as determined by a car GPS system, for example) or when the user puts the car in 'Park' or shuts off the engine, or if the radio station reception becomes poor. In such a situation, the car itself may transmit the request to the radio station application server, or the car may send a message to the user's mobile device, indicating that the car has been placed in park or the engine has shut off. In some embodiments, the mobile device itself may monitor the movement while driving, and automatically send the recording request when it determines that the user has arrived at a destination, or if movement has halted.

If the user has entered a request to continue listening to the current program, then in step 305, the user's mobile device and/or radio application server may identify the user's delivery preference for the recorded content. This identification may be performed by requesting the corresponding data from the user's configuration data, which may have been stored in step 303.

Figure 5B:
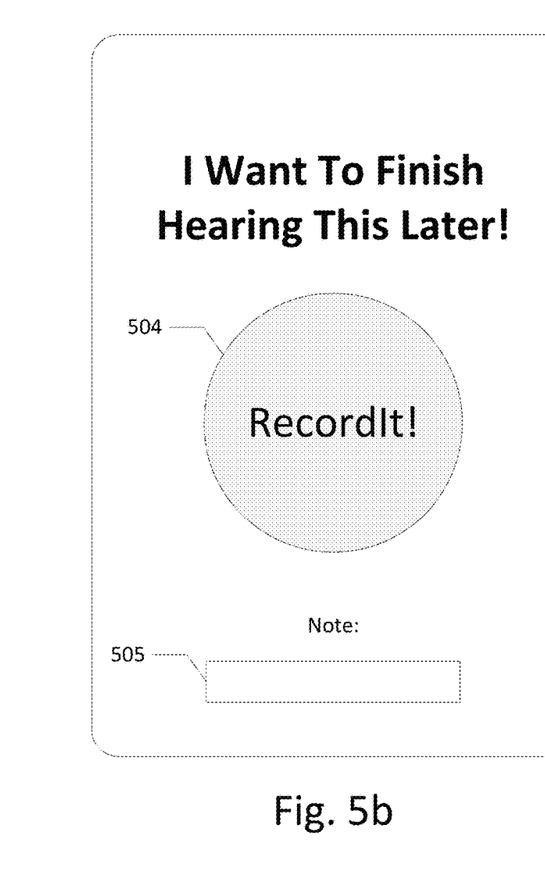

In step 306, the user's mobile device may determine whether the user provided an annotation to be included with the recording. The annotation may be any additional information that the user may wish to include with the recording, to help the user remember why he/she wanted to record the program. For example, the user may use annotation field 505 (which may be entered using an onscreen keyboard or voice-to-text transcription) to supply a short textual tag to be included with the recording. The annotation may be, for example, "The wacky radio bit from this morning [date]."

In step 307, the mobile device may begin the process of identifying the radio station for the recording by determining whether the mobile device has established a communication session, or synchronized, with the radio that would enable querying the radio to obtain the radio station and/or frequency that is currently being listened to by the user. For example, if the user's car radio and mobile device are both BLUETOOTH compatible, then the devices may use BLUETOOTH to exchange the radio station identification. If the mobile device and radio have synchronized their communications, then in step 308, the mobile device may transmit a request to the radio, and may receive a response containing information identifying the radio station. The information may be, as noted above, an identification of the radio call sign (e.g., WKRP), or the frequency.

In step 309, the mobile device may transmit a recording request to the radio application server 107. The request may include the radio station identification received from the radio. The request may also include GPS location information, to assist the server 107 in identifying the radio station (e.g., if the radio reported the frequency to the mobile device, there may be multiple different radio stations using the same frequency in different geographic locations, and the GPS information can allow the radio application server 107 to uniquely identify the radio station using the frequency).

The transmitted request may also identify a time at which the recording was requested to begin (e.g., a time when the user pressed button 504), a duration of the recording (e.g., until end of program, or a fixed amount of time from when the recording begins, etc.), user preferences for the recording (e.g., delivery method, audio quality, etc.), and information identifying the user (e.g., an account name and password, device identifier for the mobile device, etc.). Some or all of this information may be stored at the radio application server during the configuration 303, and if that is the case then the data need not also be transmitted with the recording request 309. The recording request may then be handled by the radio application server 107, as will be discussed further below.

Figure 5C:
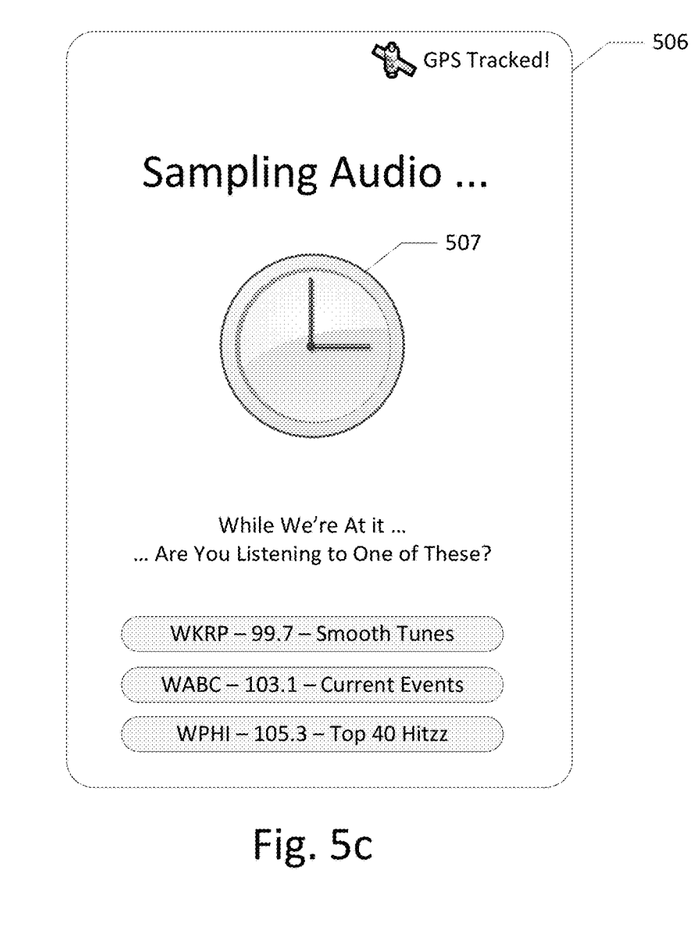

In step 307, if the user's mobile device was not synchronized with the user's car radio, then in step 310, the mobile device may begin efforts to identify the radio station that is to be recorded. In step 310, the mobile device may begin by starting to obtain an audio sample of the radio station that the user was consuming. The audio sample may be a recording made using the mobile device's microphone and audio recording capability. In other embodiments, the audio sample may contain audio characteristics of the detected audio. For example, the processing may identify certain predefined sound frequencies, and may mark the points in time at which the frequencies were detected, as an audio fingerprint of the radio station. While the audio sampling is occurring, the user may be presented with an interface 506, as shown in FIG. 5c, and the interface 506 may include a sampling indication 507 that indicates to the user that the audio of the radio station is currently being recorded.

In step 311, which can occur before the recording 310 is completed, the mobile device can determine whether the user is able and/or willing to assist in the identification of the radio station. The determination can be based on configuration information stored by the user in step 303. For example, the user may indicate that the user is willing to be asked to identify the radio station for each recording request. The recording request itself may alternatively include the user's indication that the user will identify the radio station. A user may wish to assist to help ensure the accuracy of the recording.

If the user is willing to assist, then in step 312, the mobile device may display a list of candidate radio stations from which the user may select. The list of candidate stations may be the ones tagged 502 by the user, or the radio presets that are used in the car by the user (and which may be downloaded from the car, if the car supports connectivity, such as a wireless connection). In some embodiments, the mobile device may obtain its current GPS location, and transmit that to a server, which can then return a list of the active radio stations in the user's vicinity.

In step 313, the mobile device may receive a user selection of one of the displayed candidate radio stations. In step 314, the mobile device may then transmit the recording request to the radio application server 107. The request may include an identification of the radio station selected by the user, as well as a time stamp for the time when the user initially requested the recording. The radio station application server 107 may then use this information to determine the boundaries of the requested recording.

In some embodiments, the time stamp may identify one or more time ranges for which a recording is requested. For example, the user configuration information may set a default of recording ten minutes before the user request and until after the point in time of the request. Alternatively, the request may indicate a time period before the request (e.g., ten minutes before), but be open-ended to request continued recording of the radio station until a current segment or program concludes. The radio station application server 107 may store information identifying when the different radio program segments begin and end, and may use this information to determine the bounds of the recording.

The request may also include other information, such as information identifying the user, the mobile device, the mobile device's geographic location (e.g., as determined via GPS) and a desired mode of delivering the request (if any). The mode of delivery, discussed further below, may be established by the user during configuration, or it may be supplied by the user at the time of making the request.

Figure 3B:
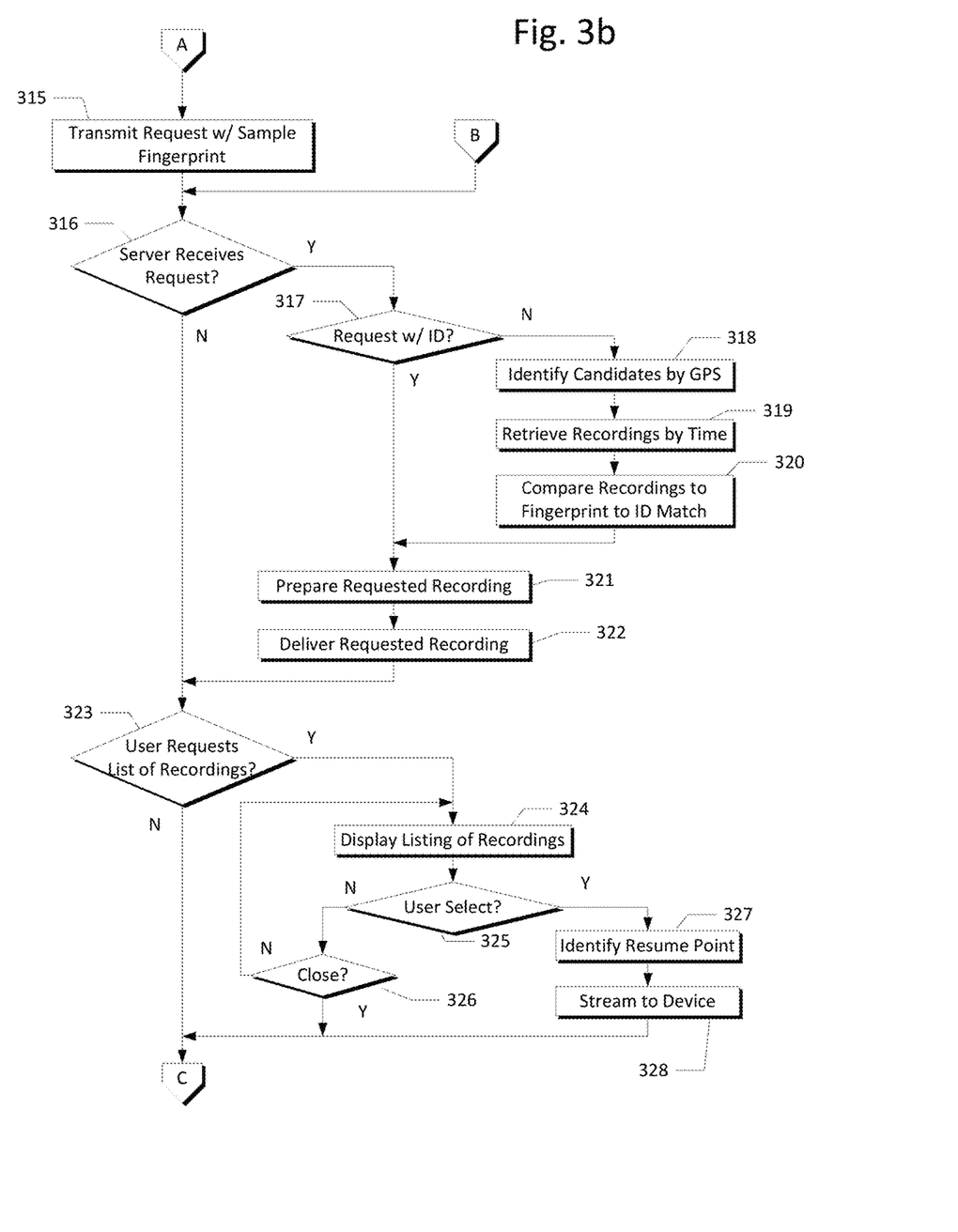

In step 311, if the user is unable or unwilling to assist in determining the radio station's identity, then in step 315, the mobile device may complete the recording (and fingerprint processing, if desired) of the radio station, and may transmit a recording request to the radio station application server. The recording request may be the same as that discussed above regarding step 314, although the request may now include the recorded audio sample of the radio station, or the results of the fingerprint processing of the radio station sample, and the time stamp information may also identify the times at which the audio sample begins and/or ends. When the request is transmitted in steps 314 or 315, the process may then proceed to step 316.

In step 316, the radio station application server 107 may determine whether it has received a recording request. If it has, then in step 317, the server 107 may determine whether the request included an identification of the radio station. If the request did not include an identification of the radio station, then the server may proceed to step 318 to begin deducing the radio station's identity. In step 318, the server may retrieve the identification of a geographic location (e.g., GPS coordinates) from the request, and consult its stored database to identify the possible radio stations whose coverage areas include that geographic location.

Then, in step 319, the server may identify the time(s) at which the audio sampling or fingerprinting was done by the mobile device, and retrieve the captured streams for the various radio stations identified in step 318, and at the time(s) corresponding to the audio sampling. The time(s) may be based on the time stamp received with the request, and may also be modified to account for lag. For example, if there may be a period of time delay between when the user presses the button to record and when the audio sampling actually begins, and this delay may be accounted for when determining the time of the request.

In step 320, the user's captured audio sample or fingerprint is then compared with the various retrieved recordings, to identify a matching audio pattern. For example, the server 107 may compare the audio sample or audio fingerprint with the corresponding sample or fingerprint of the captured streams, to identify the best match. Any desired audio comparison technique may be used for this purpose. Through this process, the server 107 may then identify the radio station by identifying the stream that had the best match with the audio sample.

In step 321, the radio application server can prepare the recording in response to the user's request. Preparing the recording may include accessing the recording captured in step 302 for the stream identified in step 320, and determining the time range that is to be recorded for the user. As noted above, the recording request itself may include information identifying the recording range (e.g., from the point of the request until the end of the current program), and the radio application server can identify the points in time of the program corresponding to the user's requested recording start and end times. In doing so, the server may also retrieve a program schedule for the identified radio station, to identify the current program (based on the request time stamp), and to determine when the program (or segment) is scheduled to end.

When the start and end times are identified, the server may then store a database entry for the user's requested recording, identifying the user, the captured stream, the start time and the end time. The server may also store a copy of the captured stream, or a portion of the captured stream corresponding to the start and end times of the recording, in a memory portion allocated to the requesting user.

In step 322, the server 107 may then deliver the requested recording to the user. The delivery may vary depending on the user's preferences. For example, one form of delivery may simply be the storage of the database entry and copy of the recording, which the user can access at a later time using the mobile device and/or another device connected to a common network such as the Internet. To support this, the server may maintain an Internet server that the user can log in to and retrieve previously-recorded content.

Another example of delivery may include electronic mail. For example, the server may send an e-mail to the user's registered email address, and the email may contain a link to the recorded content and/or a copy of the content itself.

Another example of delivery may include delivery to a different device of the user's. For example, in the configuration process, the user may enter an address identifying another device (e.g., a tablet computer, desktop, etc.) to which the recorded content should be delivered. The other device may be associated with a different service. For example, the user may indicate that the recording should be delivered to the user's account with a service that provides a digital video recorder (DVR) function to the user, and the recorded radio stations may be added to a listing of other content (e.g., movies, television programs, etc.) that the user has recorded using the DVR.

Figure 5D:
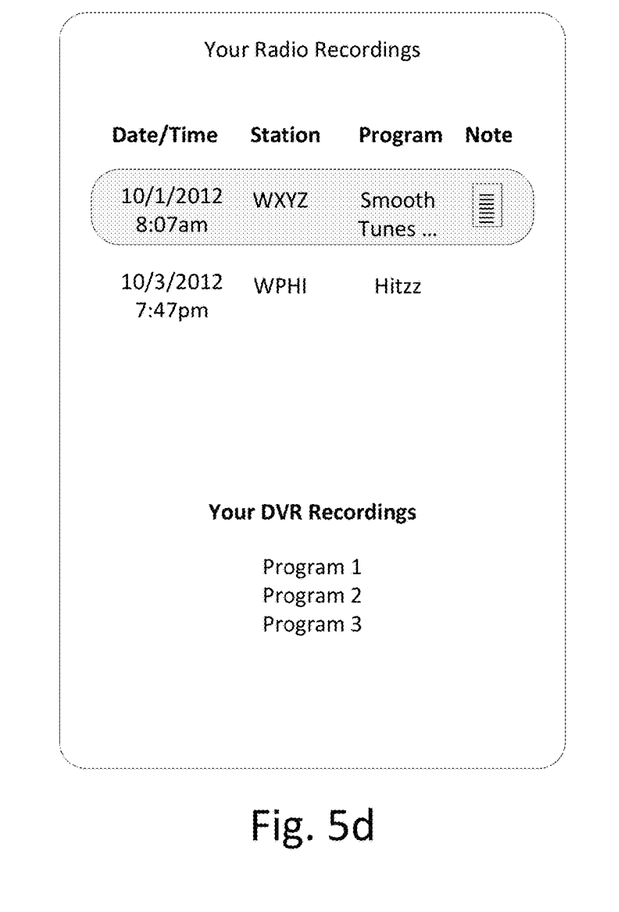

In step 323, the mobile device, application server, DVR, or other device of the user may check to determine whether the user has requested to see a listing of recordings. This may be done by any of these devices, as the user may use any of those devices to access the recording. For example, when the user is ready to get back in the car after work, the user may wish to resume listening to the radio program on his/her mobile device. Using the device, the user may open an application or a network browser and transmit a request to the radio application server, identifying the user and requesting a listing of recordings. The radio station application server may deliver 324 a listing of recordings, such as that shown in FIG. 5d. As illustrated, the listing may identify the date/time of the recording, the station that was recorded, the name or description of the program that was recorded, and any additional notes or information (e.g., notes that the user entered when making the recording request). The listing may also list recordings that are available on other devices, such as the user's DVR noted above. This listing of other devices may allow the user to decide whether he/she wants to listen to the recording at another time and on another device.

In step 325, the device may determine whether the user selected a listed recording, e.g., by touching or highlighting one of the listed entries. If the user did not, the process may proceed to step 326 to determine if the user requested to close the application. If the user did, then the process may return to step 324 to continue the display of the listings and await a selection.

If the user selected a listing, then in step 327, the device may determine what playback point is requested. The playback point may be selected by the user. For example, after selecting a listing, the user may be presented with a timeline of the recording, and the user may be allowed to select a point on the timeline for the playback to begin. Alternatively, the playback point may be a default, such as the beginning of the program or segment, or the point in time when the original recording request was made, or some predetermined time offset from the request time (e.g., beginning 30 seconds before the request was made).

The identified resume point may be identified to the radio station application server, and in step 328, the radio station application server may initiate a stream to deliver the requested program to the device at the requested resume point. Of course, if the recording was already stored on the device, the device itself can simply resume the playback at the desired point, without transmitting a streaming request to the radio station application server. In some embodiments, the playback may be preceded by an inserted advertisement or other content supplied by the radio station application server.

As an alternative to playback, the user may also request to transmit the recording to another individual, such as via a social network or email. In such situations, the user may transmit a forward request to the radio station application server, and the server may prepare a copy of the program or the database information and deliver it to the user's friend.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
   receiving, by one or more computing devices and from a user device, a request to record audio content associated with an airing audio station, wherein the request to record the audio content associated with the airing audio station comprises a request to record a remaining portion of an audio station program, the remaining portion aired subsequent to the request to record the audio content associated with the airing audio station;
   receiving, by the one or more computing devices, location information corresponding to the user device;
   determining, based on the location information, a candidate list of audio stations;
   causing display of the candidate list of audio stations;
   receiving, by the one or more computing devices, a user selection of an indicator of the airing audio station from the candidate list of audio stations;
   preparing, based on the user selection of the indicator of the airing audio station, a recording by the one or more computing devices of the airing audio station; and
   sending, to a device associated with a user of the user device and different from the one or more computing devices, a message with a link to the recording of the airing audio station.

2. The method of claim 1, further comprising:
   sending the recording of the airing audio station to a digital video recorder (DVR); and
   generating, for display, a listing of recorded content associated with the DVR, the listing of recorded content comprising recorded programs, the recorded programs comprising the recording of the airing audio station.

3. The method of claim 2, wherein the listing of recorded content comprises:
   a listing for the audio station program and a textual note inputted by the user.

4. The method of claim 1, further comprising:
   determining, based on user preferences of the user, one or more audio recording settings,
   wherein the preparing the recording by the one or more computing devices of the airing audio station comprises preparing the recording according to the one or more audio recording settings.

5. The method of claim 1, wherein the request to record the audio content associated with the airing audio station is received after a vehicle in which the user device is located has been shifted into a park mode.

6. The method of claim 1, further comprising:
   receiving, by the one or more computing devices, a program listing of programs scheduled to play on the airing audio station, the program listing comprising the audio station program;
   determining, by the one or more computing devices and based on the program listing, a deviation between an actual broadcast time of the audio station program and a scheduled playback time of the audio station program; and
   storing, by the one or more computing devices, information about the deviation between the actual broadcast time and the scheduled playback time.

7. A system comprising:
   a user device; and
   a computing device comprising:
      one or more processors; and
      memory storing executable instructions that, when executed by the one or more processors, cause the computing device to:
         receive, from the user device, a request to record audio content associated with an airing audio station, wherein the request to record the audio content associated with the airing audio station comprises a request to record a remaining portion of an audio station program, the remaining portion aired subsequent to the request to record the audio content associated with the airing audio station;
         receive location information corresponding to the user device;
         determine, based on the location information, a candidate list of audio stations;
         cause display of the candidate list of audio stations;
         receive a user selection of an indicator of the airing audio station from the candidate list of audio stations;

prepare, based on the user selection of the indicator of the airing audio station, a recording of the airing audio station; and send, to a different device associated with a user of the user device and different from the computing device, a message with a link to the recording of the airing audio station.

8. The system of claim 7, wherein the executable instructions, when executed by the one or more processors, cause the computing device to:

send the recording of the airing audio station to a digital video recorder (DVR); and generate, for display, a listing of recorded content associated with the DVR, the listing of recorded content comprising recorded programs, the recorded programs comprising the recording of the airing audio station.

9. The system of claim 7, wherein the executable instructions, when executed by the one or more processors, cause the computing device to:

determine, based on user preferences of the user, one or more audio recording settings, and prepare the recording of the airing audio station by preparing the recording according to the one or more audio recording settings.

10. The system of claim 8, wherein the executable instructions, when executed by the one or more processors, cause the computing device to:

generate, for display, a listing for the audio station program as part of the listing of recorded content associated with the DVR, the listing for the audio station program comprising a textual note inputted by the user.

11. The system of claim 7, wherein the executable instructions, when executed by the one or more processors, cause the computing device to:

receive a program listing of programs scheduled to play on the airing audio station, the program listing comprising the audio station program;

determine, based on the program listing, a deviation between an actual broadcast time of the audio station program and a scheduled playback time of the audio station program; and store information about the deviation between the actual broadcast time and the scheduled playback time.

12. The system of claim 7, wherein the executable instructions, when executed by the one or more processors, cause the computing device to:

send the recording of the airing audio station to a different device after receiving a message comprising a selection of the recording of the airing audio station from a list of recorded programs; and send a playback starting point for the recording of the airing audio station, wherein the playback starting point:

is based on a time at which the request to record the audio content associated with the airing audio station was received; and is a predetermined amount of time before the time at which the request to record the audio content associated with the airing audio station was received.

13. The system of claim 7, wherein the executable instructions, when executed by the one or more processors, cause the computing device to receive the request to record the audio content associated with the airing audio station after a vehicle in which the user device is located has been shifted into a park mode.

14. An apparatus comprising:

one or more processors;

memory storing executable instructions that, when executed by the one or more processors, cause the apparatus to:

receive, from a user device, a request to record audio content associated with an airing audio station, wherein the request to record the audio content associated with the airing audio station comprises a request to record a remaining portion of an audio station program, the remaining portion aired subsequent to the request to record the audio content associated with the airing audio station;

receive location information corresponding to the user device;

determine, based on the location information, a candidate list of audio stations;

cause display of the candidate list of audio stations;

receive a user selection of an indicator of the airing audio station from the candidate list of audio stations;

prepare, based on the user selection of the indicator of the airing audio station, a recording of the airing audio station; and send, to a device associated with a user of the user device, a message with a link to the recording of the airing audio station.

15. The apparatus of claim 14, wherein the executable instructions, when executed by the one or more processors, cause the apparatus to:

send the recording of the airing audio station to a digital video recorder (DVR); and generate, for display, a listing of recorded content associated with the DVR, the listing of recorded content comprising recorded programs, the recorded programs comprising the recording of the airing audio station.

16. The apparatus of claim 14, wherein the executable instructions, when executed by the one or more processors, cause the apparatus to:

determine, based on user preferences of the user, one or more audio recording settings, and prepare the recording of the airing audio station by preparing the recording according to the one or more audio recording settings.

17. The apparatus of claim 14, wherein the executable instructions, when executed by the one or more processors, cause the apparatus to:

receive a program listing of programs scheduled to play on the airing audio station, the program listing comprising the audio station program;

determine, based on the program listing, a deviation between an actual broadcast time of the audio station program and a scheduled playback time of the audio station program; and store information about the deviation between the actual broadcast time and the scheduled playback time.

18. The apparatus of claim 14, wherein the executable instructions, when executed by the one or more processors, cause the apparatus to:

send the recording of the airing audio station to a different device after receiving a message comprising a selection of the recording of the airing audio station from a list of recorded programs; and send a playback starting point for the recording of the airing audio station, wherein the playback starting point:

is based on a time at which the request to record the audio content associated with the airing audio station was received; and is a predetermined amount of time before the time at which the request to record the audio content associated with the airing audio station was received.

19. The apparatus of claim 15, wherein the executable instructions, when executed by the one or more processors, cause the apparatus to:

generate, for display, a listing for the audio station program as part of the listing of recorded content associated with the DVR, the listing for the audio station program comprising a textual note inputted by the user.

20. The apparatus of claim 14, wherein the executable instructions, when executed by the one or more processors, cause the apparatus to receive the request to record the audio content associated with the airing audio station after a vehicle in which the user device is located has been shifted into a park mode.

* * * * *

UNITED STATES PATENT AND TRADEMARK OFFICE
CERTIFICATE OF CORRECTION

PATENT NO. : 10,320,502 B2
APPLICATION NO. : 13/740887
DATED : June 11, 2019
INVENTOR(S) : Chris Kennedy Page 1 of 1

It is certified that error appears in the above-identified patent and that said Letters Patent is hereby corrected as shown below:

In the Specification

Column 4, Detailed Description, Line 16:
Please delete "112," and insert --113,--

In the Claims

Column 13, Line 63:
In Claim 13, after "to", insert --:--

Column 15, Line 16:
In Claim 20, after "to", insert --:--

Signed and Sealed this
Tenth Day of December, 2019

Andrei Iancu
*Director of the United States Patent and Trademark Office*